United States Patent [19]

Schmidt

[11] 4,103,927

[45] Aug. 1, 1978

[54] CORNER MOUNT REACH CLAMP WITH HINGED CLAMP PADS

[75] Inventor: Kenneth J. Schmidt, Thurston, Oreg.

[73] Assignee: General Trailer Company, Inc., Springfield, Oreg.

[21] Appl. No.: 778,661

[22] Filed: Mar. 17, 1977

[51] Int. Cl.² ............................................... B60D 1/14
[52] U.S. Cl. ................................... 280/482; 280/142; 403/377
[58] Field of Search ..................... 280/482, 404, 142; 403/104, 377, 204

[56] References Cited

U.S. PATENT DOCUMENTS 3,181,881   5/1965   Van Raden ...................... 280/404 X

FOREIGN PATENT DOCUMENTS 2,335,119   7/1974   Fed. Rep. of Germany ........... 403/377

*Primary Examiner*—John A. Pekar
*Attorney, Agent, or Firm*—Kolisch, Hartwell, Dickinson & Stuart

[57] ABSTRACT

A clamping device utilizing hingedly interconnected clamping members and operating mechanism for forcing the clamping members against a trailer reach telescopically received in a trailer member to frictionally secure the trailer reach and trailer member in a selected adjusted position relative to each other.

9 Claims, 6 Drawing Figures

U.S. Patent  Aug. 1, 1978  4,103,927
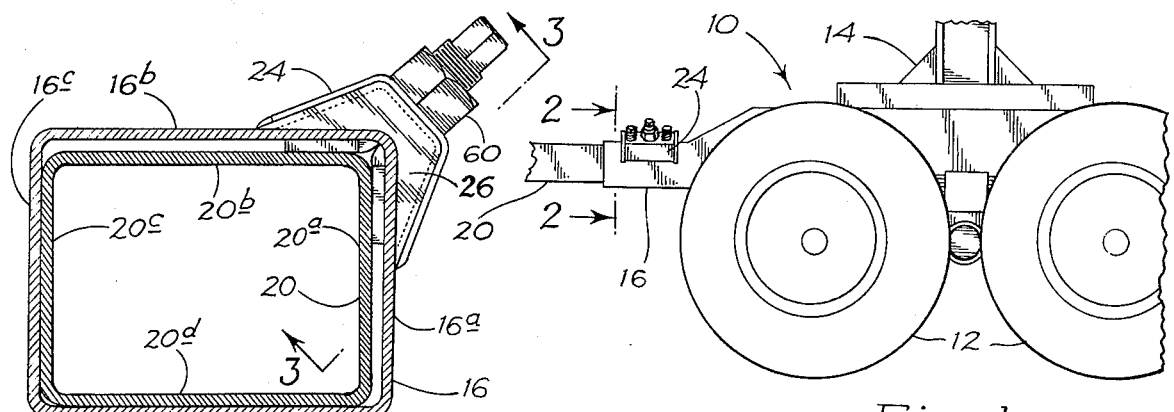
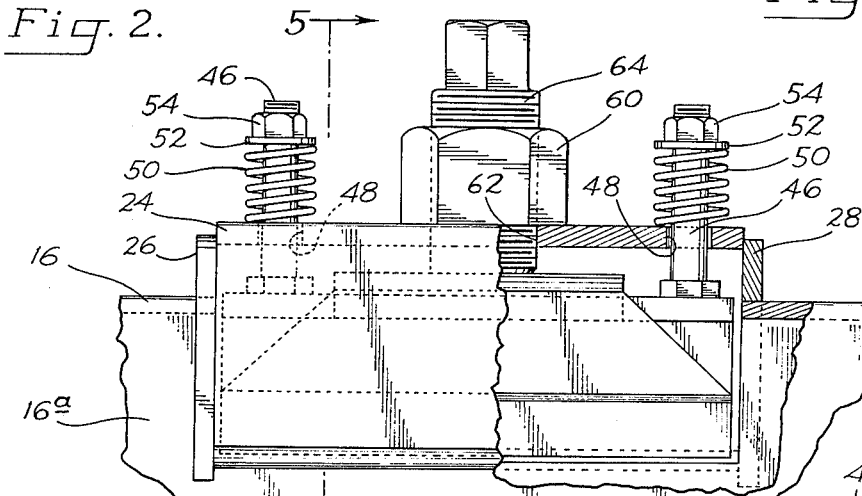
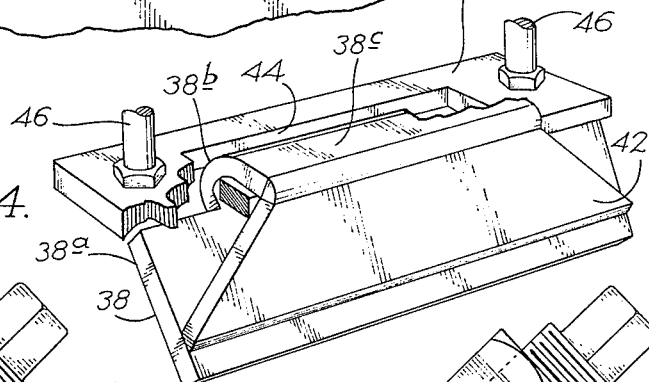
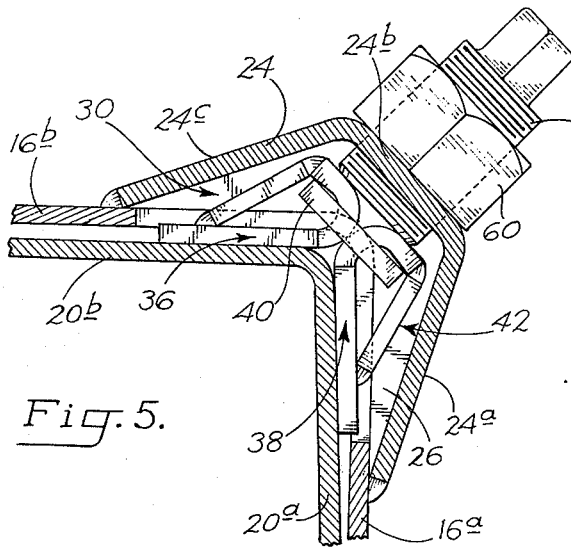
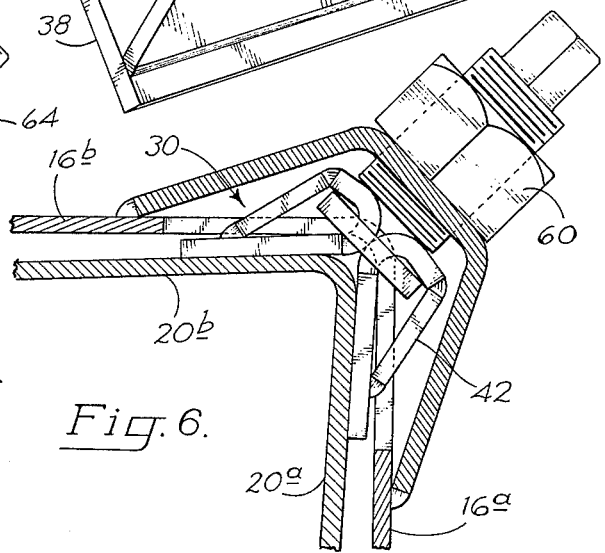

CORNER MOUNT REACH CLAMP WITH HINGED CLAMP PADS

BACKGROUND AND SUMMARY OF THE INVENTION

This invention relates to clamping mechanism for securing a telescopically adjustable trailer reach and trailer member in a selected position relative to each other.

Trailers which are required to carry loads of varying lengths often are provided with extensible reaches, whereby the trailer can be adjusted in length. An extensible reach structure may include two rectangular elongate members which telescopically fit one within the other. The trailer length is adjusted by axial shifting of the members relative to each other and securing them in a selected position by means of a clamping device.

The inner reach member on which the clamping force is exerted may tend to deform with repeated clamping force applied thereto. It also may be bent, deformed, warped or otherwise changed in physical configuration during normal use, or may have significantly smaller cross-sectional dimensions than the outer member into which it telescopically fits.

Heretofore clamps have been provided which utilize a force extending diagonally of the rectangular cross section of the reach member. Such prior clamps, however, are unsatisfactory for the reason that the clamping member generally has been unable to conform to the various physical configurations of the inner reach member to which force is to be applied. This in prior devices has resulted in decreased contact area with consequent decreased holding power of the clamp.

A principal object of the present invention is to provide a novel reach clamp for engaging a corner portion of a reach member, wherein the clamping members are hingedly interconnected and adapt to the varying physical configurations of the trailer reach to provide holding power superior to conventional trailer reach clamps.

Another object of the present invention is to provide novel corner clamping means for a reach member, which clamping mechanism is positively guided in a path directed diagonally toward and away from a corner of the reach member.

Yet another object of the present invention is to provide such novel clamping mechanism in which the clamping members are yieldably biased diagonally outwardly and away from the corner of the reach member whereby they will shift outwardly and away from the reach member to release the same when operating mechanism in the device is released.

DRAWINGS

These and other objects and advantages will become more fully apparent as the following description is read in conjunction with the drawings wherein:

FIG. 1 is a side view of the rear assembly of a log truck trailer showing wheels, structure on which logs are supported, and depicting a portion of a reach member with clamping mechanism according to the invention in operation;

FIG. 2 is an enlarged, cross-sectional view taken along the line 2—2 in FIG. 1;

FIG. 3 is an enlarged view taken along the line 3—3 in FIG. 1 with a portion of the mechanism broken away to expose a portion of the internal clamp structure;

FIG. 4 is an enlarged, perspective view of a plate connector member on which is hingedly mounted a clamping member in the structure;

FIG. 5 is a cross-sectional view taken along the line 5—5 in FIG. 3 illustrating the clamping mechanism operating upon a reach member in which sides thereof are disposed normal to each other; and FIG. 6 is a sectional view also taken along the line 5—5 of FIG. 3 illustrating operation of the clamping mechanism on a reach member which is somewhat deformed.

DETAILED DESCRIPTION OF A PREFERRED EMBODIMENT OF THE INVENTION

Referring to the drawings, and first, more specifically to FIG. 1, at 10 is indicated generally a trailer assembly of a truck having wheels 12 and bunk structure 14 on which loads may be supported. At the forward end of trailer 10 is an elongate, forwardly extending trailer member 16.

As is best seen in FIG. 2, member 16 is hollow and substantially rectangular in cross section. It includes sides 16a, 16b, 16c, 16d, respectively.

The trailer is connected to the tractor (not shown) of the truck by an elongate, rectangular reach member 20. The reach member has an outer surface configuration which is substantially complementary to the inner surface of trailer member 16, and fits slidably and telescopically therein. As is best seen in FIG. 2, sides 20a, 20b, 20c, 20d of the reach member are adjacent and parallel to sides 16a, 16b, 16c, 16d of the trailer member respectively. The overall length of the truck may be adjusted by selected axial adjustment between trailer member 16 and reach member 20.

Secured, as by welding, to a corner portion of trailer member 16 is a housing 24 which, as is best seen in FIGS. 2, 3 and 5 is formed from a plate with portion 24a, 24b, 24c in angularly disposed relationship to each other. As is best seen in FIGS. 5 and 6, portions 24a, 24c, are secured, as by welding, to sides 16a, 16b, respectively, of member 16. Opposite ends of housing 24 are closed by plates 26, 28 respectively.

As is best seen in FIGS. 3, 5 and 6, rectangular portions are cut from sides 16a, 16b within the confines of housing 24 and end plates 26, 28 to provide a chamber 30 opening into the interior of trailer member 16. Positioned within chamber 30 are a pair of clamping members 36, 38 which are hingedly interconnected by a connector plate 40 for swinging toward and away from each other, as will be described in greater detail below. Clamping members 36, 38 are similar, and therefore, only one will be described in detail.

As is best seen in FIG. 4, clamping member 38 includes a substantially rectangular, generally planer, reach-engaging portion 38a, a curve connecting portion 38b, which is integrally and rigidly secured to an edge margin of portion 38a, and a substantially planar actuating portion 38c which is integral with and rigidly secured to curve portion 38b and extends at an acute angle relative to portion 38a. A reinforcing member 42 extends between the outer end of actuating portion 38c and reach engaging portion 38a and is secured, as by welding, thereto for maintaining a preselected distance between such portions.

Connector plate 40 is substantially planer, and has an elongate, rectangular slot 44 defined therein, as is best seen in FIG. 4. The curved portions of clamping members 36, 38 extend loosely through slot 44 and thus are hingedly interconnected to each other and to connector plate 40 for swinging toward and away from each other.

Bolts 46 are secured, as by welding, to opposite end portions of connector plate 40 and extend substantially normally outwardly from the upper surface thereof. A pair of bores 48 (see FIG. 3) defined in portion 24*b* of housing 24 slidably receive bolts 46 therethrough. Such bolts and bores act as guides to control movement of connector plate 40 and clamping members 36, 38 during operation as will be described below.

A spring, or biasing means, 50 encircles each of bolts 46 between the outer surface of portion 24*b* of housing 24 and the under surface of a washer 52 and nut 54 threaded onto bolts 46.

A nut 60 is secured to portion 24*b* of housing 24 in alignment with a bore 62 extending through portion 24*b*. A square headed screw, or bolt, 64 extends threadably through nut 60 with its longitudinal axis extending diagonally of trailer member 16 and reach member 20. Screw 64 is substantially aligned with a corner of reach member formed by sides 20*a*, 20*b*.

As is best seen in FIGS. 3, 5 and 6, the inner end of screw 64 is positioned to engage the actuating portions of clamping members 36, 38.

Describing operation of the apparatus, and first the release of reach member 20 whereby it may be shifted axially relative to member 16, screw 64 is screwed outwardly permitting springs 50 to draw connector member 40 and clamping members 36, 38 mounted thereon outwardly and away from reach member 20 and into recess 30.

With the clamping members released from the reach member it may be shifted axially relative to trailer member 16.

After the reach member has been shifted to a desired adjusted position axially of trailer member 16, it is a simple matter to operate the clamping mechanism to secure the reach member in position. All that is required is operation of screw 64. As this occurs, the inner end of screw 64 engages the actuating portions of clamping members 36, 38 and urges the clamping members and connecting member 40 toward the reach member. The clamping members engage angularly disposed side portions 20*a*, 20*b* of the reach member adjacent a corner thereof and by being pressed diagonally against the reach member by operation of screw 64 press sides 20*c*, 20*d* of the reach member against sides 16*c*, 16*d*, respectively, of the trailer member to frictionally secure the same within the trailer member.

As is best illustrated in FIG. 6, where sides 20*a*, 20*b* are at other than 90° to each other the clamping arrangement of the present invention takes advantage of the hinged interconnection between clamping members 36, 38 to apply appropriate force to the reach member over a larger contact area than could a non-hinged or rigid angle clamp. The greater frictional interface resulting from the larger area contacted by the hinged clamping members, provides superior holding power.

By the inner end of screw 64 engaging the actuating portions of the clamping members and pressing them inwardly toward the reach member, and with the clamping members being hingedly interconnected, they are swung inwardly toward each other and against the adjacent angularly disposed sides of the reach member, but have freedom to conform to the actual angle between such sides of the reach member.

While a preferred embodiment of the invention has been described herein, it should be apparent to those skilled in the art that variations and modifications are possible without departing from the spirit of the invention.

What is claimed is:

1. In a trailer,
   an elongate trailer member having a substantially rectangular opening therein,
   an elongate reach member having a cross section substantially complementary to said opening in said trailer member, said reach member extending telescopically into said opening in the trailer member permitting adjustment therebetween, and
   clamping means for securing said reach member in a selected adjusted position relative to said trailer member comprising a pair of clamping members hingedly interconnected for swinging relative to one another, said clamping members being mounted on said trailer member and positioned to engage angularly disposed side portions of said reach member adjacent a corner thereof and operating means engaging said clamping members operable to urge said clamping members to swing toward each other to conform to the angle between such side portions and to force said clamping members against said side portions of said reach member to frictionally secure the same within said trailer member.

2. In the trailer of claim 1, wherein said clamping means further comprises a connector member to which said clamping members are hingedly connected adjacent a corner of said reach member.

3. In the trailer of claim 1, wherein said operating means comprises means operatively interposed between said trailer member and clamping members actuatable for moving said clamping members diagonally of said trailer member into engagement with said reach member.

4. In a trailer,
   an elongate trailer member having a substantially rectangular opening therein,
   an elongate reach member having a cross section substantially complementary to said opening in said trailer member, said reach member extending telescopically into said opening in the trailer member permitting adjustments therebetween, and
   clamping means for securing said reach member in a selected adjusted position relative to said trailer member comprising a pair of hingedly interconnected clamping members mounted on said trailer member and positioned to engage angularly disposed side portions of said reach member adjacent a corner thereof, each clamping member including an elongate reach engaging portion and an actuating portion rigidly secured relative to said reach engaging portion and extending at a substantial angle outwardly therefrom, and operating means operable to force said clamping members against said side portions of said reach member to frictionally secure the same within said trailer member, said operating means including an operating member positioned to engage said actuating portion and upon operation of said operating means to apply a force to said actuating portion to urge said reach engaging portion to swing toward the other of said clamping members and against said reach member.

5. In the trailer of claim 4, wherein said clamping means further comprises a plate having a slot formed therein and a clamping member includes a curved portion extending loosely through said slot to hingedly connect said clamping member to said plate adjacent a corner of said reach member.

6. In the trailer of claim 5, wherein said reach-engaging and actuating portions are rigidly interconnected by said curved portion.

7. In the trailer of claim 6, wherein said operating means further includes means actuatable to urge said operating member in the direction of said actuating portion to apply a force to said actuating portion to urge said reach-engaging portion to swing toward the other of said clamping members and against said reach member.

8. In the trailer of claim 5, which further comprises guide means operatively connected to said plate for restricting movement of said plate to a path of movement extending diagonally of and toward and away from said reach member.

9. In the trailer of claim 8, which further comprises biasing means yieldably urging said plate and clamping members outwardly and away from said reach member to release the same from said reach member when said operating means is released.

* * * * *